Sept. 1, 1953 C. D. COURSON ET AL 2,650,463
REEL TYPE MOWING MACHINE
Filed Jan. 18, 1950 2 Sheets-Sheet 1

INVENTORS
CLARENCE D. COURSON
WARREN C. COURSON
BY *G. H. Braddock*
ATTORNEY

Sept. 1, 1953  C. D. COURSON ET AL  2,650,463
REEL TYPE MOWING MACHINE
Filed Jan. 18, 1950  2 Sheets-Sheet 2

INVENTORS
CLARENCE D. COURSON
WARREN C. COURSON
BY
*S. H. Braddock*
ATTORNEY

Patented Sept. 1, 1953

2,650,463

UNITED STATES PATENT OFFICE 2,650,463

REEL TYPE MOWING MACHINE

Clarence D. Courson and Warren C. Courson, Worthington, Minn.

Application January 18, 1950, Serial No. 139,286

2 Claims. (Cl. 56—249)

This application is a continuation in part of our pending application Serial No. 65,838, for a Machine for Mowing Tall Grass, filed December 17, 1948, now abandoned.

The invention herein presents a machine for cutting grass, weeds, etc.

The object is to provide a mowing machine incorporating features and characteristics adapted to render the machine an improvement over machines for the same purpose heretofore known, especially in the accomplishment of the cutting of tall grass or weeds.

In the accompanying drawings forming a part of this specification,

Figure 1:
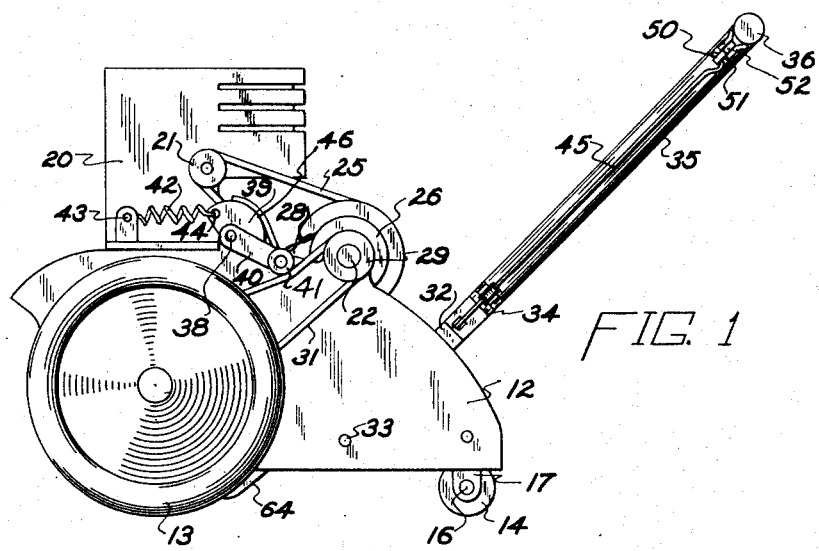
Fig. 1 is a side elevational view of a mowing machine incorporating features and characteristics of the invention.
Figure 2:
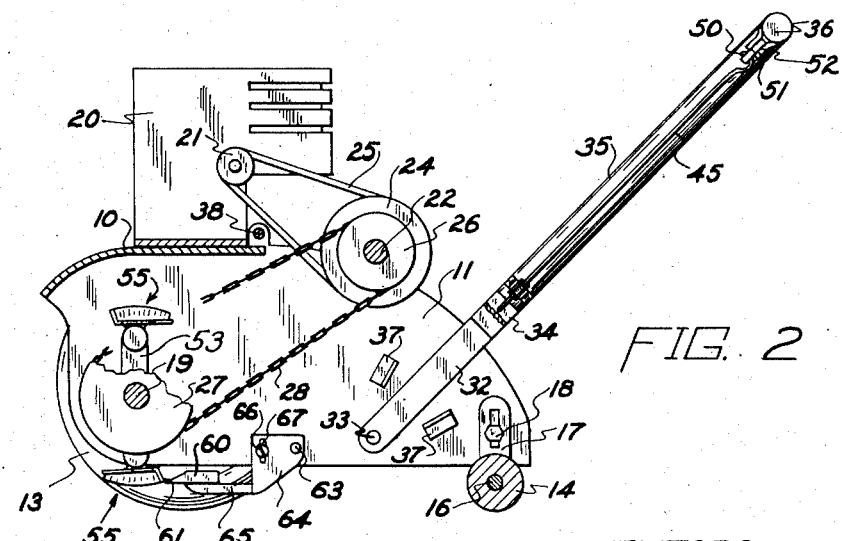
Fig. 2 is a vertical, longitudinal sectional view, taken on line 2—2 in Fig. 4.

With respect to the drawings and the numerals of reference thereon, a metallic frame of the machine consists of a horizontal upper wall 10 and vertical, spaced, parallel side walls, denoted 11 and 12, respectively, extending downwardly from and integral or rigid with opposite side edges of said upper wall 10.

The frame of the machine is supported at the front thereof on wheels 13, 13 disposed exteriorly of the side walls 11 and 12, and at the rear thereof on an idler roller 14 disposed transversely of said frame between rearward portions of said side walls.

Each wheel 13 is rigid with a horizontal stub shaft 15 rotatably mounted on a frame side wall, 11 or 12, as the case may be, in perpendicular relation thereto.

The supporting roller 14 is mounted upon a horizontal, transverse spindle 16 opposite ends of which are supported in lower portions of spaced brackets 17, 17 each secured, as at 18, for vertical adjustment upon one of the frame side walls. The construction and arrangement are such that the spaced brackets 17 selectively can be adjusted upwardly or downwardly upon said frame side walls thus to cause the rollers 14 to support the rearward portion of the machine frame at higher or lower elevation.

A reel for supporting rotary blades or knives of the mowing machine includes a horizontal, transverse driven shaft 19 having its opposite ends rotatably mounted in portions of the frame side walls 11 and 12 disposed forwardly and downwardly of the stub shafts 15, 15.

A prime mover 20, which is an internal combustion engine as disclosed, is suitably and conveniently supported upon the upper wall 10 of the machine frame and includes a driven shaft with fixed pulley 21.

The frame side walls 11 and 12 suitably and conveniently rotatably support an intermediate horizontal, transverse shaft 22 disposed between said side walls, and extensions 23, 23 of said intermediate shaft are disposed exteriorly of said frame side walls. The intermediate shaft 22 is situated at elevation above the wheel axles and the supporting roller 14 and below the pulley 21, rearwardly of the wheels and said pulley 21 and forwardly of said supporting roller.

A pulley 24 fixed upon the intermediate shaft 22 between the frame side walls 11 and 12 is longitudinally alined with the pulley 21, and a belt 25 rides said pulleys 21 and 24. A sprocket 26 fixed upon said intermediate shaft 22 between the pulley 24 and the frame side wall 12 is longitudinally alined with a sprocket 27 fixed upon an end portion of the driven shaft 19 adjacent said side wall 12, and a sprocket chain 28 rides said sprockets 26 and 27. The belt 25 is tensioned upon the pulleys 21 and 24 so that said shaft 19 will be rotated in response to rotation of the pulley 21, through the instrumentality of said belt, said pulley 24, the intermediate shaft 22, said sprocket 26, said sprocket chain 28 and said sprocket 27.

Each extension 23 of said intermediate shaft 22 fixedly carries a pulley 29 longitudinally alined with a pulley 30 fixed upon the stub shaft 15 at the corresponding side of the machine frame, and a belt 31 rides the pulleys 29, 30 at each side of said frame.

The mowing machine can be propelled either in response to actuation of the prime mover, or manually.

A propulsion and guide handle, at the rear of the machine, is constituted as a U-member, including spaced, parallel arms 32, 32 pivotally supported, as at 33, upon and between the frame side walls for swinging movement of the propulsion and guide handle in a vertical plane and a base 34 connecting said arms, an extension piece 35 rigid with said base, and a transverse hand piece 36 rigid with said extension piece. An intermediate portion of one of said arms 32 is disposed between spaced stops 37, 37, rigid with the internal surface of the frame side wall 11, for limiting pivotal movement of the propulsion and guide handle.

The construction and arrangement will be such that the belts 31 normally loosely ride the pulleys 29 and 30, so that the mowing machine will not be propelled in response to actuation of the prime mover or internal combustion engine 20 when this is intentional, and mechanism is included for manually tensioning said belts 31 on said pulleys 29 and 30 when it is desired that the mowing machine be power propelled.

A horizontal, transverse actuator shaft 38, disposed between the frame side walls 11 and 12 and rotatably mounted therein at elevation below the pulley 21 and above the intermediate shaft 22, rearwardly of said pulley 21 and forwardly of said intermediate shaft, fixedly supports an actuator 39 disposed interiorly of and in adjacent relation to the frame side wall 12, and also fixedly supports belt tensioning arms 40, 40 disposed exteriorly of the frame side walls 11 and 12. Each of the tensioning arms 40 supports a roller 41 in vertical alinement with an upper length of the belt 31 between the pulleys 29 and 30 at the corresponding side of the machine frame, and a tension coil spring 42, disposed forwardly of the actuator shaft 38 and having one of its ends connected, as at 43, to a fixed part, and its other end connected, as at 44, to a portion of the actuator 39 above said actuator shaft, normally retains the tensioning arms 40 with rollers 41 at their farthest distance from the belts 31.

A cable 45, having its forward end connected, as at 46, to an upper portion of the actuator 39 above the actuator shaft 38 and at the rear of the tension coil spring 42, extends first rearwardly and downwardly beneath a sheave 47 mounted upon one of the pivotal supports 33 for an arm 32 of the propulsion and guide handle, thence rearwardly and upwardly through an opening 48 in and over a sheave supported by an end portion of the base 34 of said propulsion and guide handle, thence interiorly over a sheave 49 adjacent an intermediate portion of said base 34, and thence rearwardly and upwardly parallelly of the extension piece 35 to a location adjacent the transverse hand piece 36 where said cable is connected, as at 50, to the interior end of an actuator lever 51 having its exterior end pivotally secured, as at 52, to said transverse hand piece.

When the actuator lever 51 is in released position, as disclosed in the drawings, the cable 45 will be slack thus to permit the tension coil spring 42 to retain the rollers 41, 41 in retracted relation with respect to the belts 31 and said belts to loosely ride the pulleys 29 and 30, so that the mowing machine will not be propelled in response to rotational movement of the pulley 21. Said mowing machine can, however, be manually propelled, either forwardly or rearwardly, while the belts 31 are not tensioned, through the instrumentality of the propulsion and guide handle. The cable 45 is adapted to be pulled or slid rearwardly in response to manual swinging movement of the actuator lever 51 from its position as in the drawings toward the transverse hand piece 36, and the construction and arrangement will be such that the rollers 41, 41 will be moved to engaged relation with said belts 31, 31, against resilient action of the tension coil spring 42, to cause these belts to be tensioned, in response to but slight rearward swinging movement of said actuator shaft 51. The mowing machine will be power propelled when the cable 45 is operative to cause the belts 31, 31 to be tensioned, and immediately upon release of the actuator lever 51, said tension coil spring 42 will remove the rollers 41, 41 from said belts, back to their normal, retracted positions. Drive of the wheels 13, 13 in response to actuation of the pulley 21 of course will be accomplished, when the belts 31, 31 are tensioned, through the instrumentality of the belt 25, the pulley 24, the intermediate shaft 22, the pulleys 29, 29, said belts 31, 31 and the pulleys 30, 30 on the stub shafts 15, 15.

The horizontal, transverse driven shaft 19 of the reel of the mowing machine rigidly supports spaced radial arms 53 of said reel which in turn rigidly support blade carrying bars or rods 54, secured to the outer ends of the radial arms 53, extending longitudinally of the reel and transversely of the machine frame. In the disclosure as made, there are two blade carrying bars or rods 54 disposed at diametrically opposite sides of the driven shaft 19 in parallel, equidistantly spaced relation thereto. That is, the blade carrying bars or rods 54 are spaced at 180 degrees apart. The blade carrying bars or rods 54 are of length to extend substantially across the width of the machine frame. As shown, the opposite ends of said blade carrying bars or rods terminate in slightly spaced relation to the frame side walls 11 and 12.

Figure 3:
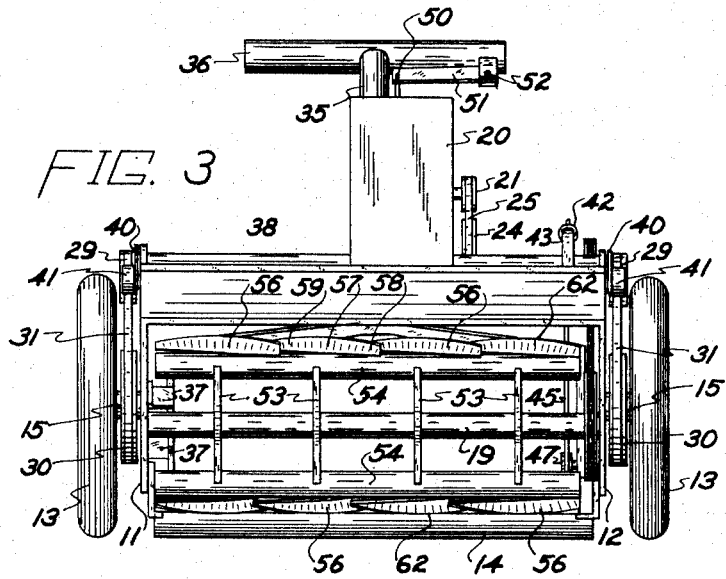
Fig. 3 is a front elevational view disclosing the mowing machine as it would appear from the left in Fig. 1.

Each of the bars or rods 54 fixedly supports a bank 55 of spaced, elongated blades or knives 56 which are strung out along the lengths of said bars or rods. Herein, for convenience, we term the bank of spaced blades or knives upon one of the bars or rods a first bank of blades and the bank of spaced blades or knives upon the other of said bars or rods a second bank of blades. The blades of each of said first and second banks are secured to the surface of the corresponding bar or rod 54 which is directly opposite the driven shaft 19, to extend away from both said driven shaft and the bar or rod by which supported. The rotary cutting blades 56 are disposed generally longitudinally of the bars or rods 54, but, at the same time, each rotary cutting blade is disposed in oblique relation to its corresponding bar or rod 54. That is, an intermediate portion 57 of each rotary cutting blade is secured to the external surface of the bar or rod by which supported, a leading end portion 58, at the right in Fig. 3, of each rotary cutting blade projects forwardly, and a following end portion 59, at the left in said Fig. 3, of each rotary cutting blade projects rearwardly. The outer end of the leading end portion 58 of an outermost cutting blade, at the right in Fig. 3, of each bank terminates flush with the adjacent end of the bar or rod by which supported, the outer end of the following end portion 59 of an outermost rotary cutting blade, at the left in said Fig. 3, of each bank terminates flush with the adjacent end of the bar or rod by which supported, and the leading and following end portions 58 and 59 of adjacent rotary cutting blades of each bank are in slightly overlying or overlapping relation, with the leading end portions disposed forwardly of the following end portions in the direction of rotation of the driven shaft 19, and hence of the reel of which said driven shaft is a part.

A stationary cutting blade or knife 60, extending transversely of the machine frame beneath the frame side walls 11 and 12, includes a forward, horizontal, transverse cutting edge 61 situated to be wiped over by the cutting edges 62 of all of the cutting blades 56 in response to rotary movement of said cutting blades. The stationary cutting blade or knife 60 is supported upon the frame side walls 11 and 12 for vertical adjustment, toward and away from the rotary cutting blades 56, in order that there can be compensation for wear, as well as for removal of metal occasioned by sharpening. As disclosed, the frame side walls pivotally support, as at 63, brackets 64 which in turn support a transverse bar 65 with which the stationary cutting blade 60 is rigid. Headed and nutted bolts 66 in the frame side walls 11 and 12 and in vertical slots 67 in the brackets 64 are adapted to be loosened when said brackets are to be rotatably adjusted, about the pivotal supports 63, and tightened when the brackets, and hence the transverse bar 65 and the stationary cutting blade 60, are to be set at fixed relation to the machine frame. It is evident that vertical adjustment of the cutting edge 61 can be accomplished in response to rotational adjustment of the brackets 64.

An arrangement found satisfactory in operation of the mowing machine includes rotary cutting blades, such as 56, disposed at a 30 degree angle, more or less, to the longitudinal axis of the reel. All of the rotary cutting blades of both banks are set to cut in the same direction. As shown, the rotary cutting blades of each bank are parallel, but this need not be so. In an instance where spiral blade carrying bars or rods, such as 54, are employed, sufficient banks of blades or knives 56 could be provided so that at least one blade or knife 56 would be in contact with the stationary cutting blade 60 at all times.

Figure 4:
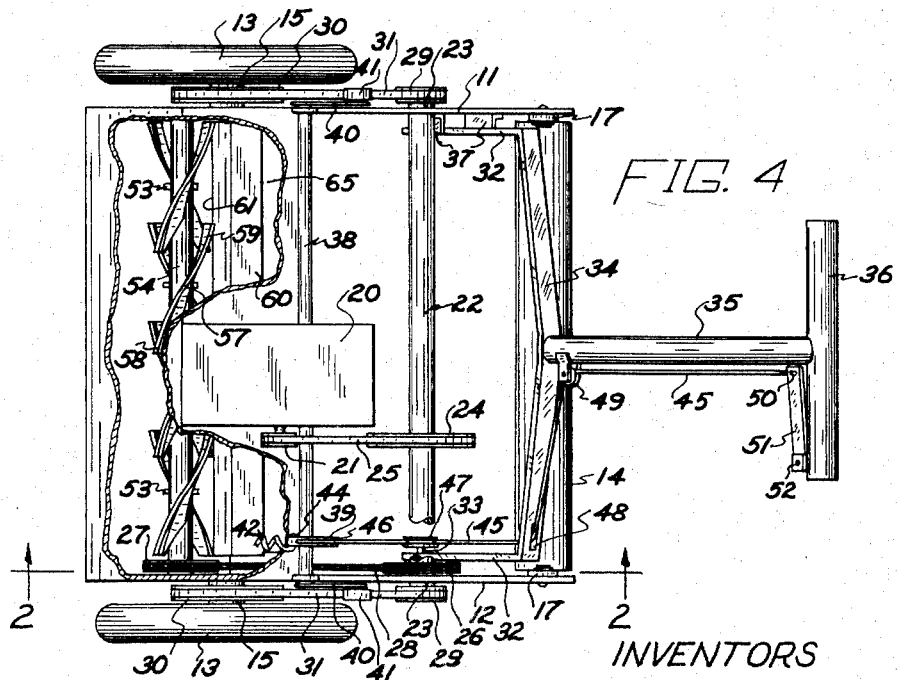
Fig. 4 is a top plan view, partially broken away, of said mowing machine.

The cutting edges 62 of all the rotary cutting blades 56 are disposed at margins of said rotary cutting blades which are opposite the supporting bar or rod, each of said cutting edges 62 is arcuately curved outwardly longitudinally of the corresponding rotary cutting blade in order to engage the cutting edge 61 of the stationary cutting blade 60 with shearing action in response to rotation of the driven shaft 19, and each rotary cutting blade 56 is shaped in the direction of its length to render the cutting edge of the blade most efficient in the accomplishment of its shearing operation along the whole of the length of said cutting edge. It will be apparent from Fig. 4 of the drawings that the rotary cutting blades there shown are not straight. Instead, each is twisted in such manner that all points along the whole of the length of the cutting edge thereof will engage the cutting edge 61 of the stationary cutting blade 60 with effective shearing action.

During practical operation of the mowing machine, the rotary cutting blades thereof, together with the reel as a unit, are rotated relatively rapidly, in response to actuation of the prime mover or internal combustion engine 20, while the machine is advanced, when manually or power propelled, at comparatively slow speed.

The construction and arrangement will be such that the rotary cutting blades 56 upon encountering upper portions of tall stalks of grass or weeds during forward and downward movement of said rotary cutting blades will cause said upper portions to be slid longitudinally along the rotary cutting blades off of the rearward ends of their following end portions 59, while portions of the tall stalks closer to the ground remain alined with the rotary cutting blades which upper portions of the tall stalks have cleared to become severed as said rotary cutting blades move downwardly and rearwardly toward and to the stationary cutting blade 60. That is, rotary cutting blades 56 cause upper portions of tall stalks which are encountered to be swung laterally of the machine until clear of any rotary cutting blade, and, at the same time, leave lower portions of the tall stalks standing and alined with the rotary cutting blade which upper portions have cleared to become severed in response to downward and rearward movement of said rotary cutting blade. All of the rotary cutting blades of the different banks in cooperation with each other cause the whole of tall grass or weed areas traversed by the mowing machine to be evenly levelled off.

Mowing machines made according to the present invention are operative as efficiently on tall grass and weeds as on shorter stuff.

What is claimed is:

1. A mowing machine comprising a movable frame, a reel extending transversely of said frame and having first and second ends thereof mounted in said frame for rotation about a horizontal axis, means for rotating said reel in a single direction, a blade carrying bar constituted as an integral part of said reel parallel to and spaced from the axis of rotation thereof, a bank of cutting blades positioned tangentially of said reel and rigid with said bar, said cutting blades being arranged in spaced, overlapping relation with respect to each other and extending longitudinally of said reel, each blade having an intermediate portion, a leading end portion disposed in advance of said intermediate portion in direction of rotation of said reel and a following end portion extending rearwardly of said intermediate portion in said direction of rotation, each of said leading end portions lying between its corresponding intermediate portion and said first end of said reel and each of said following end portions lying between its corresponding intermediate portion and said second end of said reel, and means fixedly mounted on said frame and coacting with said bank of blades for shearing grass as the machine is moved over the ground.

2. A mowing machine comprising a movable frame, a reel extending transversely of said frame and having first and second ends thereof mounted in said frame for rotation about a horizontal axis, means for rotating said reel in single direction, first and second blade carrying bars constituted as integral parts of said reel parallel to and spaced from the axis of rotation thereof, first and second banks of cutting blades positioned tangentially of said reel and integral with said first and second blade carrying bars, respectively, said cutting blades of each bank being arranged in spaced, overlapping relation with respect to the other blades of that bank and extending longitudinally of said reel, each blade having an intermediate portion, a leading end portion disposed in advance of said intermediate portion in direction of rotation of said reel and a following end portion extending rearwardly of said intermediate portion in said direction of rotation, each of said leading end portions lying between its corresponding intermediate portion and said first end of said reel and each of said following end portions lying between its corresponding intermediate portion and said second end of said reel, said second bank of blades being spaced from said first bank, and means fixedly supported on said frame and coacting with said first and second bank of blades for shearing grass as the machine is moved over the ground.

CLARENCE D. COURSON.
WARREN C. COURSON.

References Cited in the file of this patent

UNITED STATES PATENTS

| Number | Name | Date |
|---|---|---|
| 1,899,439 | Gratiot | Feb. 28, 1933 |
| 2,160,259 | Cooper | May 30, 1939 |
| 2,220,705 | Burckes | Nov. 5, 1940 |
| 2,453,819 | Smith | Nov. 16, 1948 |
| 2,495,372 | Goldberg | Jan. 24, 1950 |

FOREIGN PATENTS

| Number | Country | Date |
|---|---|---|
| 16,700 | Great Britain | 1893 |